United States Patent
Hong et al.

(10) Patent No.: US 10,623,782 B1
(45) Date of Patent: Apr. 14, 2020

(54) DEEP LEARNING BASED CACHING SYSTEM AND METHOD FOR SELF-DRIVING CAR IN MULTI-ACCESS EDGE COMPUTING

(71) Applicant: University-Industry Cooperation Group of Kyung-Hee University, Yongin-si, Gyeonggi-do (KR)

(72) Inventors: Choong Seon Hong, Yongin-si (KR); Anselme Ndikumana, Yongin-si (KR)

(73) Assignee: University-Industry Cooperation Group of Kyung-Hee University, Yongin-si (KR)

( * ) Notice: Subject to any disclaimer, the term of this patent is extended or adjusted under 35 U.S.C. 154(b) by 0 days.

(21) Appl. No.: 16/189,773

(22) Filed: Nov. 13, 2018

(30) Foreign Application Priority Data

Nov. 2, 2018 (KR) .................. 10-2018-0133873

(51) Int. Cl.
  *H04N 21/2183* (2011.01)
  *H04N 21/25* (2011.01)
  (Continued)

(52) U.S. Cl.
  CPC ......... *H04N 21/2183* (2013.01); *G06N 5/046* (2013.01); *G06N 20/00* (2019.01); *H04N 21/251* (2013.01); *H04N 21/25841* (2013.01)

(58) Field of Classification Search
  CPC ............. H04N 21/2183; H04N 21/251; H04N 21/25841; G06N 5/046; G06N 20/00
  See application file for complete search history.

(56) References Cited

U.S. PATENT DOCUMENTS

| 10,037,231 | B1 * | 7/2018 | Jakhetiya ............. G06F 9/5072 |
| 2017/0289593 | A1 | 10/2017 | Li et al. |
| 2017/0374580 | A1 | 12/2017 | Mathew |

FOREIGN PATENT DOCUMENTS

| CN | 108549719 A | * | 9/2018 |
| KR | 10-2017-0122092 A | | 11/2017 |

(Continued)

OTHER PUBLICATIONS

"Ying He, Software-Defined Networks with Mobile Edge Computing and Caching for Smart Cities: A Big Data Deep Reinforcement Learning Approach, Dec. 2017, IEEE Communications Magazine, vol. 55, Issue 12" (Year: 2017).*

(Continued)

*Primary Examiner* — Omar S Parra
(74) *Attorney, Agent, or Firm* — Studebaker & Brackett PC (57) ABSTRACT

A caching system based on the invention can include an object requiring a content and an MEC server configured to determine caching contents based on a first prediction value, which may include the probability of the content being requested by the object within an allotted area and a prediction rating of the content, and download and cache the determined caching contents from a content provider. The object can include a recommendation module configured to recommend a content from among the caching contents by applying a k-means algorithm and binary classification to the first prediction value and a second prediction value, which may include a prediction value associated with a characteristic of a user, and a deep learning based caching module configured to search available MEC servers on a movement path of the object, select an optimal MEC server, and download and cache the recommended content from the optimal MEC server.

11 Claims, 5 Drawing Sheets

(51) Int. Cl.
*G06N 5/04* (2006.01)
*H04N 21/258* (2011.01)
*G06N 20/00* (2019.01)

(56) References Cited

FOREIGN PATENT DOCUMENTS

| KR | 10-2018-0099206 A | 9/2018 |
|---|---|---|
| WO | 2018/049563 A1 | 3/2018 |

OTHER PUBLICATIONS

Zhao Zhongliang et al; "Mobility Prediction-Assisted Over-the-Top Edge Prefetching for Hierarchical VANETs", IEEE Journal on Seleted Areas in Communications, IEEE Service Center, vol. 36, No. 8, Aug. 1, 2018, pp. 1786-1801, Piscataway, U.S.
Anselme Ndikumana et al., "Deep Learning Based Caching for Self-Driving Car in Multi-access Edge Computing", Networking and Internet Architecture (cs.NI), arXiv:1810.01548v1, Oct. 3, 2018, 13 pages.

\* cited by examiner

DEEP LEARNING BASED CACHING SYSTEM AND METHOD FOR SELF-DRIVING CAR IN MULTI-ACCESS EDGE COMPUTING

CROSS-REFERENCE TO RELATED APPLICATIONS

This application claims the benefit under 35 USC § 119(a) of Korean Patent Application No. 10-2018-0133873 filed on Nov. 2, 2018 in the Korean Intellectual Property Office, the entire disclosure of which is incorporated herein by reference for all purposes.

TECHNICAL FIELD

The present invention relates to a deep learning based caching system and method, more particularly to a deep learning based caching system and method for autonomous driving in a multi-access edge computing environment.

BACKGROUND ART

The self-driving car was introduced to save lives by preventing accidents resulting from human error and improper behavior and can relieve the user of the stress of controlling a car and driving while keeping watch of the surrounding environment. It is anticipated that the self-driving car will gradually be introduced to public transportation. When the time comes at which a driver operating a car no longer needs to worry about the self-driving car, the self-driving car will become a new cultural space in which to enjoy various contents. Accordingly, there is a need for providing entertainment contents to the self-driving car.

However, providing infotainment contents from existing data centers may entail prolonged communication delays between the car and the data center and may incur undesirable effects to the provision of contents.

DISCLOSURE

Technical Problem

An objective of the present invention is to provide a deep learning based caching system and method that can minimize delays in downloading contents for passengers of a self-driving car and is supported by MEC (multi-access edge computing) and data centers to provide contents matching the requirements of the passengers.

Technical Solution

A caching system according to an embodiment of the present invention can include an object requiring a provision of a content, and an MEC (multi-access edge computing) server that is configured to determine caching contents based on a first prediction value, which may include the probability of the content being requested by the object within an allotted area and a prediction rating of the content, and is configured to download and cache the determined caching contents from a content provider, where the object can include a recommendation module configured to identify and recommend a recommended content from among the caching contents by applying a k-means algorithm and binary classification to the first prediction value and a second prediction value, the second prediction value comprising a prediction value associated with a characteristic of a user of the object, and a deep learning based caching module configured to search available MEC servers on a movement path of the object, select an optimal MEC server for downloading the recommenced content from among the available MEC servers, and download and cache the recommended content from the optimal MEC server.

Advantageous Effects

An embodiment of the present invention can minimize the download delay of contents for passengers of a self-driving car and can provide contents that fit the demands of the passengers.

Also, an embodiment of the present invention can provide real-time low latency contents for mobile users during high-traffic time periods in the city.

MODE FOR INVENTION

Descriptions of specific structures or functions relating to certain embodiments derived based on the concept of the present invention as set forth in the present specification are provided merely as examples for explaining the embodiments derived from the concept of the invention. The embodiments can be practiced in a variety of implementations and are not limited to the embodiments described herein.

Figure 1:
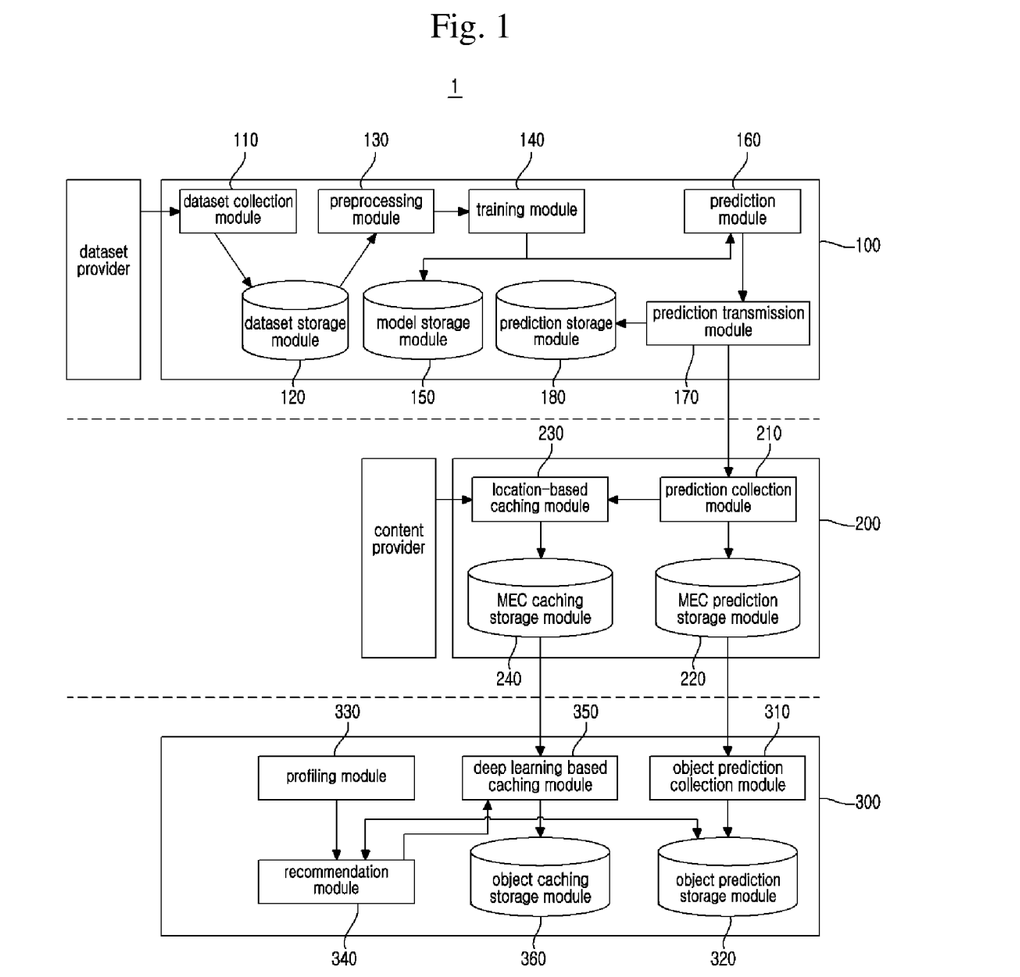
FIG. 1 illustrates a caching system according to an embodiment of the present invention.

FIG. 1 illustrates a caching system according to an embodiment of the present invention.

Referring to FIG. 1, a caching system 1 according to an embodiment of the present invention may include a data center 100, an MEC server 200, and an object 300.

A caching system 1 according to an embodiment of the present invention can be applied to an MEC (multi-access edge computing) environment. MEC refers to a network environment in which computing is performed at each network edge instead of at a centralized cloud, so as to reduce cloud load and shorten data processing time. MEC can include at least one or more MEC servers 200 corresponding to network edges and can exchange data with an object 300 located within an area allocated to such MEC servers 200.

In the descriptions below, the term "object 300" in the present specification can be used to mean any apparatus or device that can receive contents from a data center 100 or MEC servers 200 and provide the contents to the user using the object 300. While the following is described for cases in which the "object 300" is a self-driving car, the "object 300" can include any apparatus or device that can provide the function described above, without being limited to a self-driving car.

The data center 100 may collect a dataset of content viewers, i.e. a set of various users using contents, may use the collected dataset to generate a prediction value (hereinafter referred to as a first prediction value) that includes a probability of a content being requested from an object 300 within the area allocated to the MEC server 200 as well as a prediction rating of the content, and may transmit the generated first prediction value to the MEC server 200. Here, the dataset can include at least one of an age, gender, and location of the content viewer, a content rating, and a content type, and can be collected from dataset providers.

The data center 100 may include a dataset collection module 110, a dataset storage module 120, a preprocessing module 130, a training module 140, a model storage module 150, a prediction module 160, a prediction transmission module 170, and a prediction storage module.

The dataset collection module 110 may collect datasets regarding content viewers from a dataset provider. As described above, the datasets may include information on contents or content viewers. The dataset collection module 110 may store the collected datasets in the dataset storage module 120.

The preprocessing module 130 may perform a preprocessing procedure, for processing missing values and outliers, on the datasets collected by the dataset collection module 110. If missing values or outliers are detected in a dataset, preprocessing may be performed for the dataset to process the missing values or outliers by procedures such as inserting, removing, replacing, etc., a corresponding value.

The training module 140 may train an MLP (multilayer perceptron) model, using as input the collected datasets or with the datasets preprocessed by way of the preprocessing module 130. The MLP can be composed of three or more nodes, including an input layer, a hidden layer, and an output layer, and can use a nonlinear activation function to identify data that cannot be separated with a linear model. The training module may train the MLP model with the datasets referred to above as input, in order to perform predictions regarding contents that will be required in the area of the MEC server 200, and may store the trained MLP model in the model storage module 150.

The prediction module 160 may use the MLP model trained by way of the training module 140 to generate first prediction values (i.e. MLP result values) and may classify the contents based on the locations of the MEC server 200. To be more specific, the first prediction values may be generated as the MLP result values obtained when the datasets for the content viewers within the area of the MEC server 200 are used as input for the trained MLP model.

The prediction transmission module 170 may store the first prediction values generated by way of the prediction module 160 in the prediction storage module or may transmit the first prediction values to the MEC server 200. As the first prediction values may have different values according to the position in which the MEC server 200 is located and according to the allocated area, the prediction transmission module 170 may transmit the first prediction values for each of the MEC servers 200.

The MEC server 200 may determine caching contents based on the first prediction values transmitted from the data center 100 and may download and cache the determined caching contents from the content provider. At least one or more MEC servers 200 may be arranged at a macro base station, WiFi access point, or road side unit on a network edge close to the object 300, i.e. the self-driving car, to cache contents that match the characteristics of the user of the object 300.

To this end, the MEC server 200 may include a prediction collection module 210, an MEC prediction storage module 220, a location-based caching module 230, and an MEC caching storage module 240.

The prediction collection module 210 may download the first prediction values from the prediction transmission module 170 of the data center 100. The prediction collection module 210 may store the downloaded first prediction values in the MEC prediction storage module 220.

The location-based caching module 230 may determine caching contents as those contents of which the first prediction values received from the data center 100 are greater than or equal to a preset threshold value from among the contents, may download the determined caching contents from the content provider, and cache the caching contents in the MEC caching storage module 240. Here, the preset threshold value can be set for each of the probability of the content being requested by the object 300 within the area allocated to the MEC server 200 and the prediction rating of the content included in the first prediction value. A more detailed description of the operation of the location-based caching module 230 will be provided later on.

The object 300 may identify a content matching the requirements of the user using the object 300 and may download and cache the identified content from the MEC server 200. For example, in cases where the object 300 is a self-driving car, the object 300 may identify the content matching the requirements of a passenger in consideration of the characteristics of the passenger riding the self-driving car. By caching the identified content, the download delay of the content can be minimized.

To this end, the object 300 may include an object prediction collection module 310, an object prediction storage module 320, a profiling module 330, a recommendation module 340, a deep learning based caching module 350, and an object caching storage module 360.

The object prediction collection module 310 may, based on the location of the object 300, download the first prediction values from the MEC server 200 located at the nearest distance from the object 300 and may store the first prediction values in the object prediction storage module 320. For example, in the case of a self-driving car, the first prediction values may be collected from the MEC server 200 located closest to the current position of the self-driving car.

The profiling module 330 may use a CNN (convolutional neural network) to generate a prediction value (hereinafter referred to as a second prediction value) regarding the characteristic of the user of the object 300. The CNN may include at least one or more convolutional layers, where a convolutional layer may include a filter for extracting features and an activation function for converting the values of the filter into nonlinear values. The CNN may extract features from the input data by using the convolutional layers above and identify the class scores (such as age, gender, or emotion classes) that the user of the object 300 could potential belongs to by using at least one or more fully connected layers. Here, the input data for generating a second prediction value can be, for example, a facial image of the user. For instance, in cases where the object 300 is a self-driving car, an image of a passenger's face captured by a camera included in the self-driving car can be used as input data for the CNN, and in cases where the object 300 is a mobile terminal, an image of the user's face captured by a camera included in the mobile terminal can be used input data for the CNN.

Accordingly, a second prediction value generated by way of the profiling module 330 may be a value predicting a characteristic of the user such as the age, gender, or emotion of the object's user. The profiling module 330 may transmit the generated second prediction values to the recommendation module 340.

The recommendation module 340 may identify and recommend a recommended content from among the caching contents determined at the MEC server 200, by applying a k-means algorithm and binary classification on the first prediction values downloaded from the MEC server 200 and the second prediction values representing values predicting the characteristics of the user of the object 300.

The k-means algorithm applied to the first prediction values and second prediction values for identifying a recommended content may be an algorithm for lumping inputted data into a k number of clusters, being an algorithm for grouping the data such that the variance of distance difference between clusters is minimized, while binary classification may be an algorithm for grouping input data into two groups according to a particular classification rule. The recommendation module 340 can apply the algorithms above differently according to the characteristic of the user to group the content viewers, users, and contents according to characteristics and can match the grouped results to identify a recommended content fitting the requirements of the user. A more detailed description of the operation of the recommendation module 340 will be provided later on.

The deep learning based caching module 350 may search for available MEC servers 200 on the movement path of the object 300 from among the at least one or more MEC servers 200 included in the caching system 1, select an optimal MEC server 200 for downloading the recommended content from among the available MEC servers 200, and download and cache the recommended content from the optimal MEC server 200. Here, the optimal MEC server 200 can be selected in consideration of the time required for the object 300 to arrive at the area of the MEC server 200, the time required for leaving the area of the MEC server 200, and the time needed for downloading the recommended content from the MEC server 200. The deep learning based caching module 350 may select the optimal MEC server 200 from among the available MEC servers 200 on the movement path of the object 300 in consideration of the factors described above, may download the recommended content from the optimal MEC server 200, and may store the recommended content in the object caching storage module 360. A more detailed description of the operation of the deep learning based caching module 350 will be provided later on.

Figure 2:
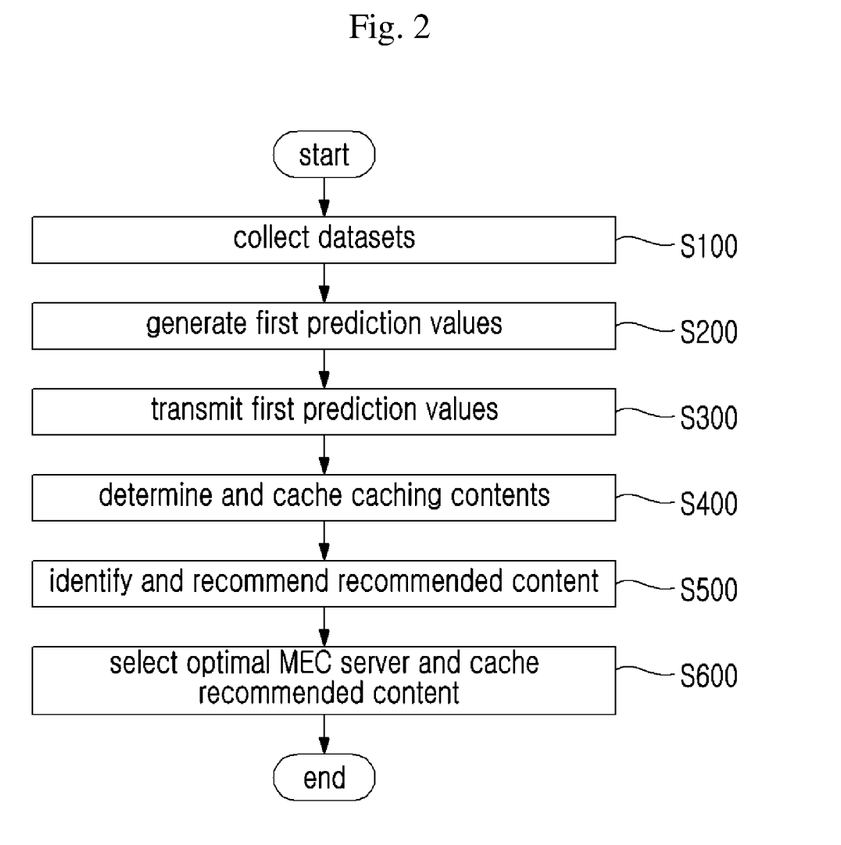
FIG. 2 is a flowchart of a caching method according to an embodiment of the present invention.

FIG. 2 is a flowchart of a caching method according to an embodiment of the present invention. In the following, certain detailed descriptions that are redundant over the descriptions provided above are omitted.

Referring to FIG. 2, a caching method according to an embodiment of the present invention may be performed by a caching system and may include collecting datasets (S100), generating first prediction values (S200), transmitting first prediction values (S300), determining and caching the caching contents (S400), identifying and recommending the recommended content (S500), and selecting an optimal MEC server and caching the recommended content (S600).

Steps S100 to S300 may be performed by a data center included in the caching system. More specifically, step S100 may include collecting datasets regarding content viewers from a dataset provider.

Step S200 may include generating first prediction values by using an MLP with the datasets collected from step S100 as the input. That is, the probability of a content being requested from an object within the area allocated to the MEC server and the rating of the content may be predicted by using the MLP, and the MLP result values may be generated as the first prediction values.

Step S300 may include transmitting the first prediction values generated via step S200 to the MEC server.

Step S400 may be performed by an MEC server included in the caching system. More specifically, step S400 may be a step of determining caching contents based on the first prediction values, which may include the probability of a content being requested by an object in the allocated area of the MEC server and a prediction rating of the content, and downloading and caching the determined caching contents from the content provider. A more detailed description of step S400 is provided below with reference to FIG. 3.

Figure 3:
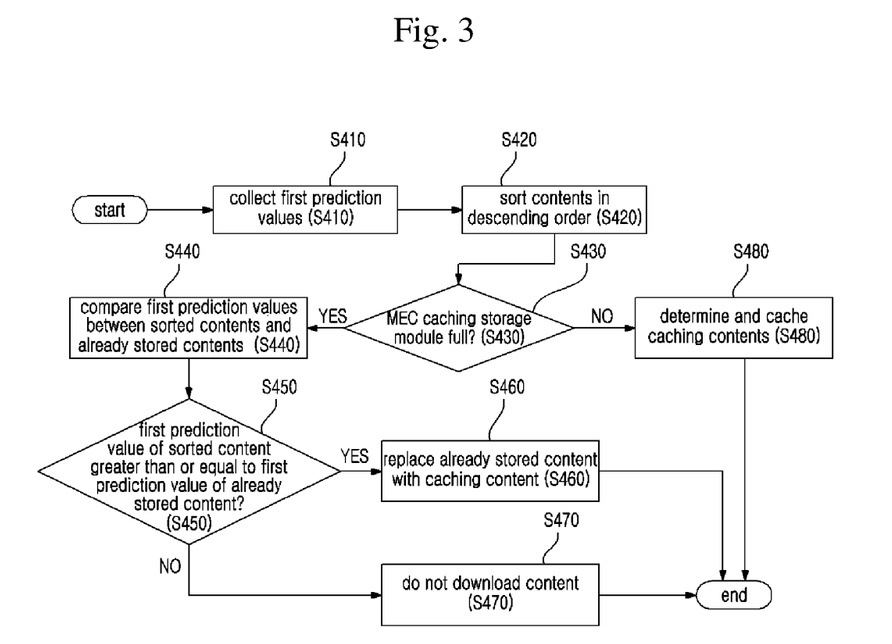
FIG. 3 is a flowchart for describing the operation of the location-based caching module illustrated in FIG. 1.

Referring to FIG. 3, which is a flowchart of the procedures for determining and caching the caching contents, in step S410, the MEC server may receive the first prediction values generated from the data center.

Next, in step S420, the contents may be sorted according to the first prediction values in descending order.

In step S430, it may be determined whether or not the storage space of the MEC caching storage module is full.

If the result of the determining in step S430 is that the storage space of the MEC caching storage module is full, then in step S440, the first prediction value for a content already stored in the MEC caching storage module may be compared with the first prediction value for a caching content.

In step S450, it may be determined whether or not the result of the comparison is that the first prediction value for the caching content is greater than or equal to the first prediction value for the content already stored in the MEC caching storage module.

According to the result of the determining in step S450, if the first prediction value for the caching content is greater than or equal to the first prediction value for the content already stored in the MEC caching storage module, then in step S460, the already stored content may be replaced by the caching content.

If the result of the determining of step S450 is that the first prediction value for the caching content is smaller than the first prediction value for the content already stored in the MEC caching storage module, then in step S470, the content may not be downloaded.

If the result of the determining of step S430 is that the storage space of the MEC caching storage module is not full, then in step S480, the contents having first prediction values that are greater than or equal to the preset threshold, from among the contents sorted in descending order via step S420, may be determined as the caching contents, and the caching contents thus determined may be cached.

Steps S500 to S600 may be performed by an included in the caching system. More specifically, step S500 may be a step of identifying and recommending a recommended content from among the caching contents determined in step S400, by applying a k-means algorithm and binary classification on the first prediction values and on the second prediction values, which may be prediction values that represent the characteristics of the object's users.

Step S600 may include searching available MEC servers on the movement path of the object and selecting an optimal MEC server for downloading the recommended content identified via step S500 from among the available MEC servers. When the optimal MEC server is selected, the recommended content may be downloaded from the selected optimal MEC server and cached.

A more detailed description of steps S500 and S600 are provided below with reference to FIG. 4 and FIG. 5.

Figure 4:
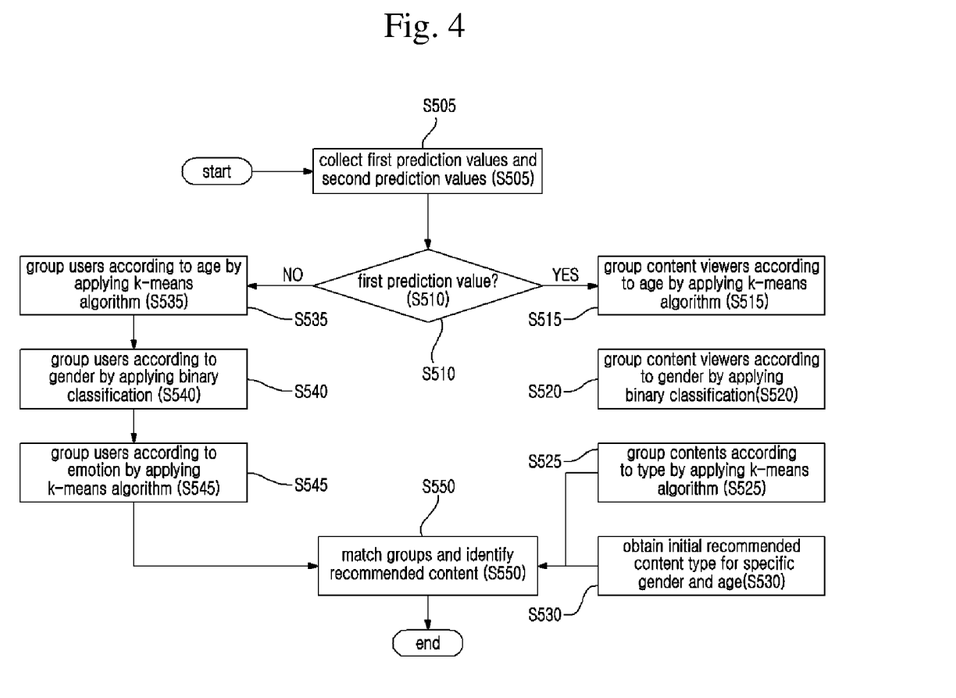
FIG. 4 is a flowchart for describing the operation of the recommendation module illustrated in FIG. 1.

FIG. 4 is a flowchart illustrating a process of identifying and recommending a recommended content.

Referring to FIG. 4, step S505 may include acquiring first prediction values, which may be MLP output values, and second prediction values, which may be CNN output values.

Step S510 may include determining whether or not the values obtained via step S505 are first prediction values or second prediction values.

If the result of the determining in step S510 is that the acquired values are first prediction values, then in step S515, first viewer groups may be generated by applying a k-means algorithm may to the first prediction values to group the content viewers according to age. Next, in step S520, second viewer groups may be generated by applying binary classification on the first prediction values to group the content viewers, belonging to the first viewer groups generated via step S515, according to gender. Lastly, in step S525, content type groups may be generated by applying a k-means algorithm to the first prediction values to group the contents used by the content viewers belonging to the second viewer groups generated via step S520 according to content type. Here, it is also possible to identify an initial recommended content according to a specific gender and age group and provide this as an initial recommended content (S530).

On the other hand, if the result of the determining in step S510 is that the acquired values are second prediction values, then in step S535, first user groups may be generated by applying a k-means algorithm to the second prediction values to group the users according to age. Next, in step S540, second user groups may be generated by applying binary classification to the second prediction values to group the users, belonging to the first user groups generated via step S535, according to gender. Lastly, in step S545, third user groups may be generated by applying a k-means algorithm to the second prediction values to group the users belonging to the second user groups generated via step S540 according to gender.

That is, when the data to which the k-means algorithm and binary classification are applied is for first prediction values, grouping may be performed in regard to the content viewers and the contents, whereas when the data is for second prediction values, grouping may be performed for the users of the object.

In step S550, the first content viewer groups and second content viewer groups obtained via steps S505 to S545 may be matched with the first user groups and second user groups, and recommended contents may be identified and recommended based on age, gender, and emotion.

Figure 5:
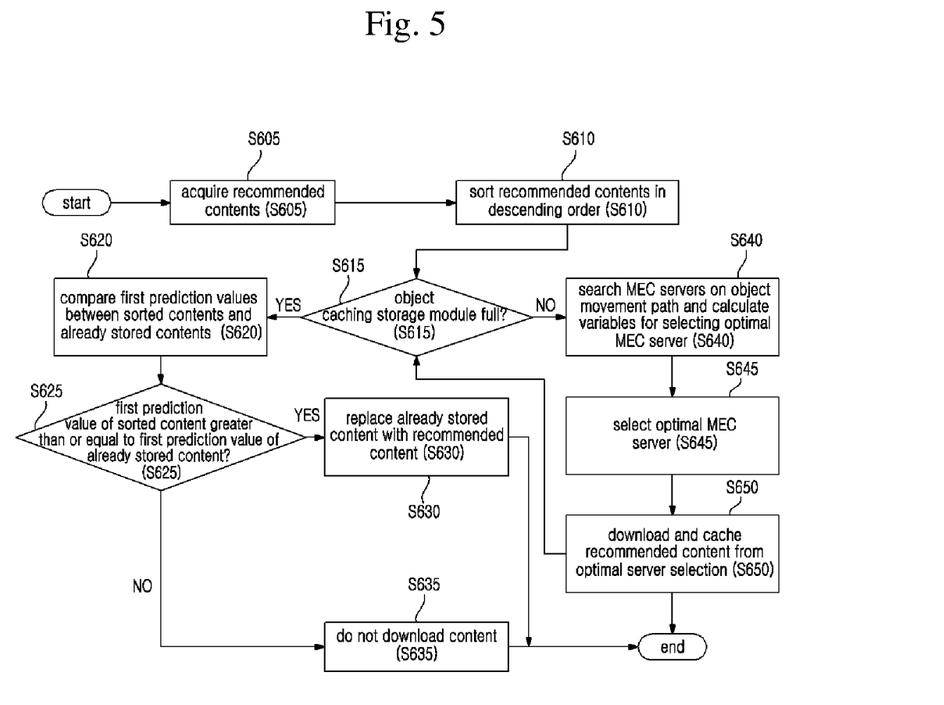
FIG. 5 is a flowchart for describing the operation of the deep learning based caching module illustrated in FIG. 1.

FIG. 5 is a flowchart illustrating a process of selecting an optimal MEC server. Referring to FIG. 5, in step S605, recommended contents may be obtained.

In step S610, the recommended contents obtained via step S605 may be sorted in descending order of first prediction values.

In step S615, it may be determined whether or not the storage space of the object caching storage module is full.

If the result of the determining in step S615 is that the storage space of the object caching storage module is full, then in step S620, the first prediction values for the contents already stored in the object caching storage module may be compared with the first prediction values for the recommended contents.

In step S625, it may be determined whether or not the result of the comparison is that the first prediction value for a recommended content is greater than or equal to the first prediction values for a content already stored in the object caching storage module.

According to the result of the determining in step S625, if the first prediction value for the recommended content is greater than or equal to the first prediction value for a content already stored in the object caching storage module, then in step S630, the already stored content may be replaced by the recommended content.

If the result of the determining of step S625 is that the first prediction value for the recommended content is smaller than the first prediction value for the content already stored in the object caching storage module, then in step S635, the content may not be downloaded.

If the result of the determining of step S615 is that the storage space of the object caching storage module is not full, then in step S640, the time required for the object to arrive at the area of the MEC server, the time required for leaving the area of the MEC server, and the time needed for downloading the recommended content may be calculated.

In step S645, an optimal MEC server may be selected by using the values calculated by way of step S640. For example, the MEC server with which it takes the longest for the object to move out of the area allocated to the MEC server can be selected as the optimal MEC server.

In step S650, the recommended contents having first prediction values that are greater than or equal to the preset threshold value, from among the recommended contents sorted in descending order by way of step S610, may be downloaded and cached from the optimal MEC server.

While the present invention is described above referencing a limited number of embodiments and drawings, those having ordinary skill in the relevant field of art would understand that various modifications and alterations can be derived from the descriptions set forth above. For example, similarly adequate results can be achieved even if the techniques described above are performed in an order different from that disclosed, and/or if the elements of the system, structure, device, circuit, etc., are coupled or combined in a form different from that disclosed or are replaced or substituted by other elements or equivalents.

The invention claimed is:

1. A caching system comprising:
   an object requiring a provision of a content; and
   an MEC (multi-access edge computing) server configured to determine caching contents based on a first prediction value and configured to download and cache the determined caching contents from a content provider, the first prediction value comprising a probability of the content being requested by the object within an allotted area and a prediction rating of the content,
   wherein the object comprises:
   a recommendation module configured to identify and recommend a recommended content from among the caching contents by applying a k-means algorithm and binary classification to the first prediction value and a second prediction value, the second prediction value comprising a prediction value associated with a characteristic of a user of the object; and
   a deep learning based caching module configured to search available MEC servers on a movement path of the object, select an optimal MEC server for downloading the recommenced content from among the available MEC servers, and download and cache the recommended content from the optimal MEC server.

2. The caching system of claim 1, further comprising a data center configured to collect a dataset regarding content viewers, generate the first prediction value by using an MLP (multilayer perceptron) using the dataset as input, and transmit the generated first prediction value to the MEC server.

3. The caching system of claim 2, wherein the MEC server comprises:
a prediction collection module configured to download the first prediction value from the data center;
a location-based caching module configured to determine a content of which the first prediction value is greater than or equal to a preset threshold value from among the contents as a caching content and configured to download and cache the determined caching contents from a content provider; and
an MEC caching storage module configured to store the caching contents.

4. The caching system of claim 3, wherein, if a storage space of the MEC caching storage module is full, the location-based caching module compares a first prediction value of a content already stored in the MEC caching storage module with a first prediction value of the caching content, and if the first prediction value of the caching content is greater than or equal to the first prediction value of the content already stored in the MEC caching storage module, the location-based caching module replaces the already stored content with the caching content.

5. The caching system of claim 1, wherein the object further comprises:
an object prediction collection module configured to download the first prediction value from an MEC server located at a nearest distance from the object based on a location of the object;
a profiling module configured to generate the second prediction value by using a CNN (convolutional neural network); and
an object caching storage module configured to store the recommended content.

6. The caching system of claim 5, wherein the recommendation module generates first viewer groups by applying a k-means algorithm to the first prediction value to group content viewers according to age, generate second viewer groups by applying binary classification to the first prediction value to group content viewers belonging to the first viewer groups according to gender, and generating content type groups by applying a k-means algorithm to the first prediction value to group contents used by content viewers belong to the second viewer groups according to content type.

7. The caching system of claim 6, wherein the recommendation module generates first user groups by applying a k-means algorithm to the second prediction value to group the users according to age, generates second user groups by applying binary classification to the second prediction value to group users belonging to the first user groups according to gender, generate third user groups by applying a k-means algorithm to the second prediction value to group users belonging to the second user groups according to emotion, matches the first content viewer groups and the second content viewer groups with the first user groups and the second user groups, and identifies and recommends the recommended content based on age, gender, and emotion.

8. The caching system of claim 5, wherein the deep learning based caching module calculates a time required by the object for arriving at an area of the MEC server, a time required for leaving an area of the MEC server, and a time needed for downloading the recommended content, and selects the optimal MEC server by using the time required by the object for arriving at an area of the MEC server, the time required for leaving an area of the MEC server, and the time needed for downloading the recommended content.

9. The caching system of claim 8, wherein, if the object caching storage module is full, the deep learning based caching module compares a first prediction value of a content already stored in the object caching storage module with a first prediction value of the recommended content, and if the first prediction value of the recommended content is greater than or equal to the first prediction value of the content already stored in the object caching storage module, the deep learning based caching module replaces the already stored content with the recommended content.

10. A caching method performed by a caching system, the caching method comprising:
determining caching contents based on a first prediction value, the first prediction value comprising a probability of the content being requested by an object within an allotted area and a prediction rating of the content;
downloading and caching the determined caching contents from a content provider;
identifying and recommending a recommended content from among the caching contents by applying a k-means algorithm and binary classification to the first prediction value and a second prediction value, the second prediction value comprising a prediction value associated with a characteristic of a user of the object;
searching available MEC servers on a movement path of the object and selecting an optimal MEC server for downloading the recommended content from among the available MEC servers; and
downloading and caching the recommended content from the optimal MEC server.

11. The caching method of claim 10, further comprising, before the determining of the caching contents:
collecting a dataset regarding a content viewer;
generating the first prediction value by using an MLP (multilayer perceptron) using the dataset as input; and
transmitting the generated first prediction value to the MEC server.

* * * * *